United States Patent
Kwon et al.

(10) Patent No.: US 11,460,906 B2
(45) Date of Patent: Oct. 4, 2022

(54) ELECTRONIC DEVICE AND OPERATION METHOD THEREOF

(71) Applicant: SK hynix Inc., Icheon-si (KR)

(72) Inventors: Ku Ik Kwon, Icheon-si (KR); Kyeong Seok Kim, Icheon-si (KR); Su Ik Park, Icheon-si (KR); Yong Joon Joo, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 17/179,233

(22) Filed: Feb. 18, 2021

(65) Prior Publication Data

US 2022/0083115 A1 Mar. 17, 2022

(30) Foreign Application Priority Data

Sep. 15, 2020 (KR) ........................ 10-2020-0118554

(51) Int. Cl.
| | |
|---|---|
| G06F 1/32 | (2019.01) |
| G06F 1/06 | (2006.01) |
| G06F 1/324 | (2019.01) |
| G06F 1/3234 | (2019.01) |

(52) U.S. Cl.
CPC ................ *G06F 1/324* (2013.01); *G06F 1/06* (2013.01); *G06F 1/3275* (2013.01)

(58) Field of Classification Search
CPC ........... G06F 1/324; G06F 1/06; G06F 1/3275
See application file for complete search history.

(56) References Cited

U.S. PATENT DOCUMENTS

| | | | |
|---|---|---|---|
| 2011/0154089 A1 | 6/2011 | Wolfe et al. | |
| 2012/0060170 A1* | 3/2012 | Vajda | G06F 9/4893 718/104 |
| 2021/0081016 A1* | 3/2021 | Hovis | G06F 1/3206 |

* cited by examiner

*Primary Examiner* — Stefan Stoynov
(74) *Attorney, Agent, or Firm* — Weaver Austin Villeneuve & Sampson LLP (57) ABSTRACT

An electronic device includes a plurality of cores, and a clock generator configured to provide a plurality of clock signals to the plurality of cores, respectively, wherein the plurality of cores includes a system core that controls the clock generator to generate the clock signals having frequencies of the respective cores, wherein the frequencies are optimized and determined based on a type of an event of the electronic device, and wherein to clock signals with optimized frequencies are applied to the respective cores in order to perform the event.

18 Claims, 5 Drawing Sheets

| EVENT | HIL CORE | FTL CORE | FIL CORE | SYS CORE |
|---|---|---|---|---|
| Default | 500MHz (Default) | 400MHz (Default) | 500MHz (Default) | 500MHz (Default) |
| SPOR | 200MHz (Light) | 800MHz (Heavy) | 500MHz (Normal) | 500MHz (Normal) |
| FTL Background | 300MHz (Light) | 300MHz (Light) | 700MHz (Heavy) | 700MHz (Heavy) |
| Preparing Power-Off | 300MHz (Light) | 300MHz (Light) | 700MHz (Heavy) | 700MHz (Heavy) |
| ... | ... | ... | ... | ... |
| Etc. | ... | ... | ... | |

ELECTRONIC DEVICE AND OPERATION METHOD THEREOF

CROSS-REFERENCE TO RELATED APPLICATION

This application claims priority under 35 U.S.C. § 119 to Korean Patent Application No. 10-2020-0118554 filed on Sep. 15, 2020, which is incorporated herein by reference in its entirety.

BACKGROUND

1. Field

Exemplary embodiments relate to an electronic device including a plurality of cores.

2. Discussion of the Related Art

The computer environment paradigm has been transitioning to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Today's memory systems provide advantages such as excellent stability and durability, high information access speed, and low power consumption. Examples of memory systems having such advantages include universal serial bus (USB) memory devices, memory cards having various interfaces, and solid state drives (SSD).

SUMMARY

Various embodiments are directed to providing an electronic device including a plurality of cores and having improved performance such as lower power consumption, and operation methods thereof.

In accordance with an exemplary embodiment, an electronic device includes: a plurality of cores; and a clock generator configured to provide a plurality of clock signals to the plurality of cores, respectively, wherein the plurality of cores includes a system core that controls the clock generator to generate the plurality of clock signals having clock frequencies, and wherein the clock frequencies are determined based on a type of an event of the electronic device and are applied to the respective cores in order to perform the event.

In accordance with an embodiment, an operation method of an electronic device including a plurality of cores, the operation method includes: determining clock frequencies of the respective cores based on a type of an event of the electronic device; and providing clock signals having the determined clock frequencies to the respective cores in order to perform the event.

In accordance with an embodiment, a data processing system includes: a host coupled to a memory system by a bus, the memory system having an electronic device coupled to a memory device, the electronic device including: a plurality of cores each configured to perform one or more jobs, and a clock generator configured to generate a plurality of clock signals provided to the plurality of cores, respectively, wherein, the plurality of cores includes a system core that controls the clock generator to generate the plurality of clock signals, and wherein, each of the plurality of clock signals has a frequency determined based on a type of an event of the electronic device, the clock signals being applied to the respective cores in order to perform the event.

According to the embodiments of the present disclosure, it is possible to provide an electronic device including a plurality of cores and having improved performance such as lower power consumption, and an operation method thereof.

DETAILED DESCRIPTION

Hereinafter, an exemplary embodiment of the present disclosure will be described in detail with reference to the accompanying drawings. It should be noted that in the following description, only parts necessary for understanding an operation in accordance with the present disclosure will be described and a description of other parts that will be known to one of skill in this art will be omitted in order not to obscure the subject matter of the present disclosure.

Figure 1:
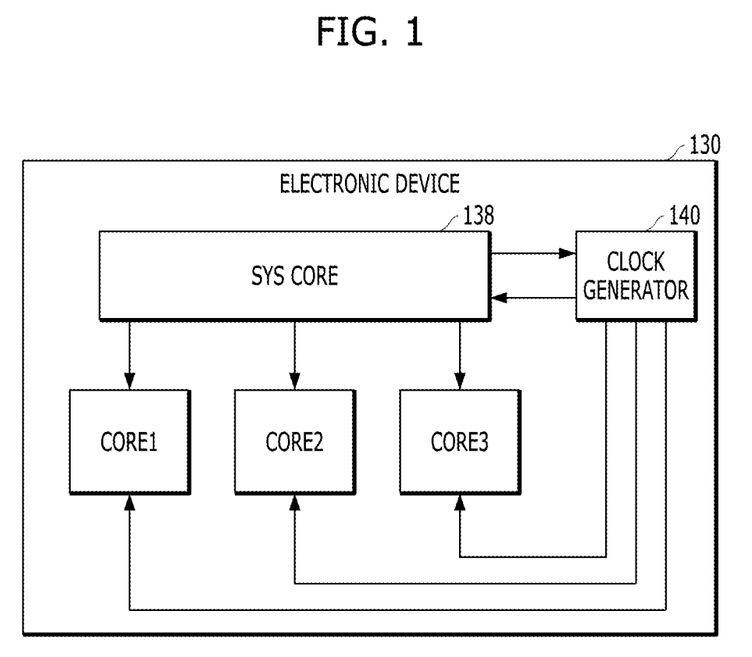
FIG. 1 is a diagram illustrating an electronic device in accordance with an exemplary embodiment of the present disclosure.

FIG. 1 is a diagram illustrating an electronic device 130 in accordance with an exemplary embodiment of the present disclosure.

Referring to FIG. 1, the electronic device 130 may include a plurality of cores CORE1 to CORE3 and system core 138, and a clock generator 140. It is to be understood that electronic device 130 may include fewer or higher number of cores and that the four cores depicted in FIG. 1 is only for illustrative purposes.

The clock generator 140 may provide clock signals to the plurality of cores CORE1 to CORE3 and 138 that electrically couple to the clock generator 140. The plurality of cores CORE1 to CORE3 and 138 may operate based on the clock signals of the clock generator 140.

As clock frequencies of the clock signals supplied to the plurality of cores CORE1 to CORE3 and 138 increase, processing speed and performance of the plurality of cores CORE1 to CORE3 and 138 may be improved. However, when the clock frequencies of several or all of the plurality of cores CORE1 to CORE3 and 138 simultaneously increase, power consumption and heat generation of the electronic device 130 may increase.

Hereinafter, an electronic device 130 that improves processing performance without substantial sacrifice in power consumption and heat generation is proposed.

In accordance with an embodiment of the present disclosure, the plurality of cores CORE1 to CORE3 and 138 may include a system core 138. The system core 138 may detect the occurrence of an event in the electronic device 130. An event refers to an operation or a series of operations performed by the electronic device 130 in response to an external or internal signal of the electronic device 130. An example of an event includes a sudden power-off recovery operation performed by the electronic device 130 when sudden power-off is detected.

In order to perform one event, at least one of the plurality of cores CORE1 to CORE3 and 138 may operate. For example, the system core 138 may perform an operation of controlling the first to third cores CORE1 to CORE3 to perform an operation required to perform the event. The first to third cores CORE1 to CORE3 may perform an operation under the control of the system core 138. An operation performed by each core within one event is referred to herein as a job.

When one event occurs in the electronic device 130, the plurality of cores CORE1 to CORE3 and 138 may perform jobs different from each other. Accordingly, workloads required by the plurality of cores CORE1 to CORE3 and 138 in order to complete one event may be different from each other. When performing an event, the system core 138 may determine the frequencies of the clock signals, which are supplied to the plurality of cores CORE1 to CORE3 and 138, respectively, according to jobs performed by the respective cores. The system core 138 may control the clock generator 140 to provide clock signals to the plurality of cores CORE1 to CORE3 and 138 according to the determined clock frequencies.

For example, the system core 138 may determine a clock frequency of a core, which performs a job with a relatively heavy workload, to be high, and determine a clock frequency of another core, which performs a job with a relatively light workload or is in an idle state, to be low. By thus adjusting the clock frequencies of the cores based on their workload, the system core 138 may substantially maintain the power consumption of the electronic device 130 within a predetermined range. That is, the system core 138 may supply less predetermined power to the core performing a job with a relatively light workload and may supply a higher predetermined power to the core performing a job with a relatively heavy workload.

Since jobs included in an event are typically performed in parallel by the plurality of cores CORE1 to CORE3 and 138, the time required for performing the event may be determined according to the execution time of a job with a heavy workload. A core performing a job with a heavy workload may quickly perform the job based on a clock signal supplied at a relatively high clock frequency. Accordingly, the electronic device 130 may quickly process the event without substantially increasing power consumption.

An example of an electronic device 130 in accordance with an exemplary embodiment of the present disclosure will be described in detail with reference to FIG. 2 to FIG. 6.

Figure 2:
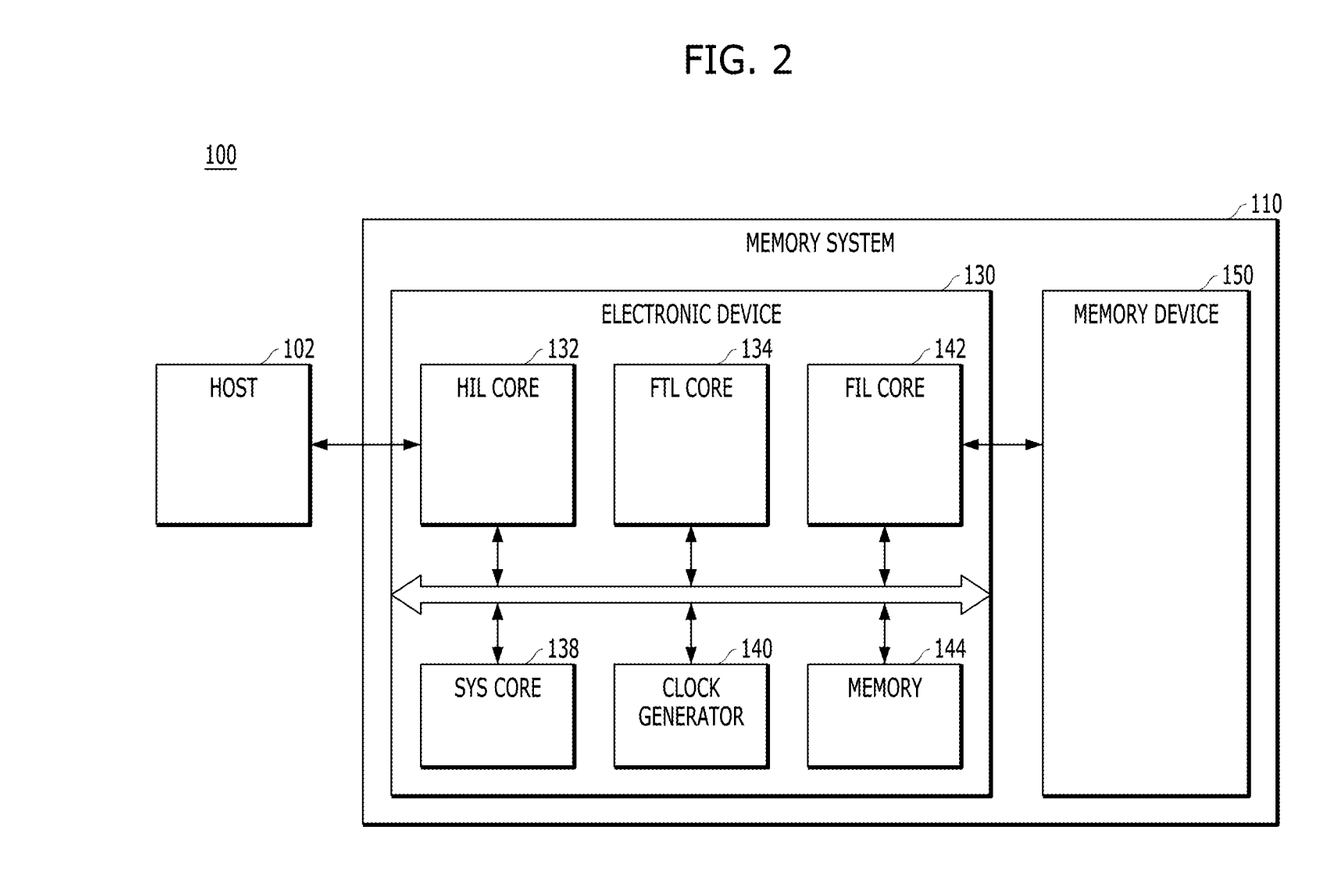
FIG. 2 is a diagram schematically illustrating an example of a data processing system including the electronic device in accordance with an exemplary embodiment of the present disclosure.

FIG. 2 is a diagram schematically illustrating an example of a data processing system 100 including the electronic device 130 in accordance with an exemplary embodiment of the present disclosure.

Referring to FIG. 2, the data processing system 100 may include a host 102 operatively coupled to a memory system 110.

The memory system 110 may include a memory device 150 and the electronic device 130 that controls the memory device 150. The electronic device 130 of FIG. 2 corresponds to the electronic device 130 described with reference to FIG. 1. That is, in the example of FIG. 2, the electronic device 130 may be a memory controller.

The host 102 may form part of any of various portable electronic devices such as a mobile phone, MP3 player and laptop computer, or any of various non-portable electronic devices such as a desktop computer, a game machine, a television (TV), and a projector.

The host 102 may include at least one operating system (OS), which may manage and control overall functions and operations of the host 102, including in some embodiments an interface with a user using the data processing system 100 or the memory system 110. The OS may support functions and operations corresponding to the purpose and usage of a user. For example, the OS may be divided into a general OS and a mobile OS, depending on the mobility provided by the host 102. The general OS may be divided into a personal OS and an enterprise OS, depending on the environment of a user.

For example, the personal OS configured to support a function of providing a service to general users may include Windows and Chrome, and the enterprise OS configured to secure and support high performance may include Windows server, Linux and Unix. Furthermore, the mobile OS configured to support a function of providing a mobile service to users and a power saving function of a system may include Android, iOS and Windows Mobile. The host 102 may include a plurality of OSs, and execute an OS to perform an operation corresponding to a user's request on the memory system 110.

The memory system 110 may operate to store data for the host 102 in response to a request of the host 102. Non-limiting examples of the memory system 110 may include a solid state drive (SSD), a multi-media card (MMC), a secure digital (SD) card, a universal serial bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and micro-MMC, hard disk drive (HDD) and the like. The SD card may include a mini-SD card and micro-SD card.

The memory system 110 may be embodied by various types of storage devices. Examples of such storage devices may include, but are not limited to, volatile memory devices such as a dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM or ReRAM), magnetic disk and a flash memory. The flash memory may have a 3-dimensional (3D) stack structure.

The electronic device 130 and the memory device 150 may be integrated into a single semiconductor device. For example, the electronic device 130 and the memory device 150 may be integrated as one semiconductor device to constitute a solid state drive (SSD). In addition, the electronic device 130 and the memory device 150 may be integrated as one semiconductor device to constitute a memory card. For example, the electronic device 130 and the memory device 150 may constitute a memory card such as a personal computer memory card international association (PCMCIA) card, compact flash (CF) card, smart media (SM) card, memory stick, multimedia card (MMC) including reduced size MMC (RS-MMC) and micro-MMC, secure digital (SD) card including mini-SD card, micro-SD card and SDHC card, or universal flash storage (UFS) device.

Non-limiting application examples of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even though power is not supplied. The memory device 150 may store data provided from the host 102 through a program operation, and provide data stored therein to the host 102 through a read operation. The memory device 150 may include a plurality of memory blocks each of which may include a plurality of pages, and each of the pages may include a plurality of memory cells coupled to a word line. In an embodiment, the memory device 150 may be a flash memory. The flash memory may have a 3-dimensional (3D) stack structure.

The electronic device 130 may control the memory device 150 in response to a request from the host 102. For example, the electronic device 130 may provide data read from the memory device 150 to the host 102, and store data provided from the host 102 into the memory device 150. For this operation, the electronic device 130 may control read, program and erase operations of the memory device 150.

The electronic device 130 may include an Host Interface Layer or HIL core 132, a Flash Tranlsation Layer or FTL core 134, a Flash Interface Layer or FIL core 142, a system core 138, a clock generator 140, and a memory 144, which are electrically coupled to each other to be operable through an internal bus as shown in FIG. 2.

The HIL core 132, the FTL core 134, and the FIL core 142 correspond to examples of the first to third cores CORE1 to CORE3 described with reference to FIG. 1.

The HIL core 132 may be configured to process command and data from the host 102, and may communicate with the host 102 through one or more of various interface protocols such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (PATA), enhanced small disk interface (ESDI) and integrated drive electronics (IDE).

The HIL core 132 may be driven through firmware referred to as a host interface layer (HIL) in order to exchange data with the host.

The FTL core 134 may control the overall operations of the memory system 110. The FTL core 134 may drive firmware in controlling the overall operations of the memory system 110. The firmware may be referred to as flash translation layer (FTL). Also, the FTL core 134 may be realized as a microprocessor or a central processing unit (CPU).

The FTL core 134 may drive the FTL and perform a foreground operation corresponding to a request received from the host. For example, the FTL core 134 may control a write operation of the memory device 150 in response to a write request from the host and control a read operation of the memory device 150 in response to a read request from the host. The FTL core 134 may perform an address mapping operation of mapping a logical address of the host 102 and a physical address of the memory device 150 in order to control the read and write operations.

Also, the electronic device 130 may perform a background operation onto the memory device 150 through the FTL core 134, which may be realized as a microprocessor or a CPU. For example, the background operation performed onto the memory device 150 may include a garbage collection (GC) operation, a wear-leveling (WL) operation, a map flush operation, or a bad block management operation, all such operations being generally known to those skilled in this art.

The FIL core 142 may serve as a memory/storage interface for interfacing the electronic device 130 and the memory device 150 such that the electronic device 130 controls the memory device 150 in response to a request from the host 102. When the memory device 150 is a flash memory or specifically a NAND flash memory, the FIL core 142 may generate a control signal for the memory device 150 and process data to be provided to the memory device 150 under the control of the FTL core 134. The FIL core 142 may work as an interface (e.g., a NAND flash interface) for processing command and data between the electronic device 130 and the memory device 150. Specifically, the FIL core 142 may support data transfer between the electronic device 130 and the memory device 150.

The FIL core 142 may be driven through firmware referred to as a flash interface layer (FIL).

The clock generator 140 illustrated in FIG. 2 corresponds to the clock generator 140 described with reference to FIG. 1. That is, the clock generator 140 may provide clock signals to the HIL core 132, the FTL core 134, the FIL core 142, and the system core 138. An example of the clock generator 140 will be described below with reference to FIG. 6.

The system core 138 illustrated in FIG. 2 corresponds to the system core 138 described with reference to FIG. 1. That is, in order to perform an event of the electronic device 130, the system core 138 may control the HIL core 132, the FTL core 134, and the FIL core 142 to perform jobs included in the event, respectively. Furthermore, the system core 138 may determine clock frequencies of the HIL core 132, the FTL core 134, the FIL core 142, and the system core 138 according to the workload of the job performed by each core in the event. The electronic device 130 may perform various types of events and the workload of the job performed by each core may be statistically determined for each event type. Furthermore, the clock frequency of each core may be experimentally determined according to the workload of the job performed by each core. An example of a method of experimentally determining the clock frequency of each core according to the type of the event will be described with reference to FIG. 3A to FIG. 3C.

The clock generator 140 may provide a clock signal having a higher frequency to a core with a heavier workload, instead of providing clock signals having default clock frequencies of the HIL core 132, the FTL core 134, the FIL core 142, and the system core 138.

The memory 144 may serve as a working memory of the memory system 110 and the electronic device 130, and store data for driving the memory system 110 and the electronic device 130. The electronic device 130 may control the memory device 150 to perform read, program and erase operations in response to the host 102. The electronic device 130 may provide data read from the memory device 150 to the host 102, and may store data provided from the host 102 into the memory device 150. The memory 144 may store data required for the electronic device 130 and the memory device 150 to perform these operations.

The memory 144 may be embodied by a volatile memory. For example, the memory 144 may be embodied by static random access memory (SRAM) or dynamic random access memory (DRAM). The memory 144 may be disposed within or outside of the electronic device 130. FIG. 2 exemplifies the memory 144 disposed within the electronic device 130. In an embodiment, the memory 144 may be embodied by an external volatile memory having a memory interface for transferring data between the memory 144 and the electronic device 130.

The memory 144 may further store data that the system core 138 may refer to in order to determine a clock frequency to be supplied to each core. The data storable in the memory 144 will be described in detail with reference to FIG. 4.

Figure 3A:
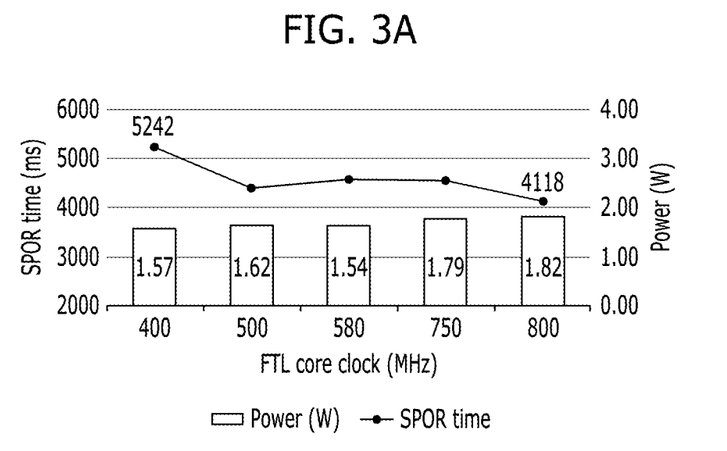
FIG. 3A to FIG. 3C illustrate how a clock frequency of each core may be experimentally determined according to the type of an event.
Figure 3B:
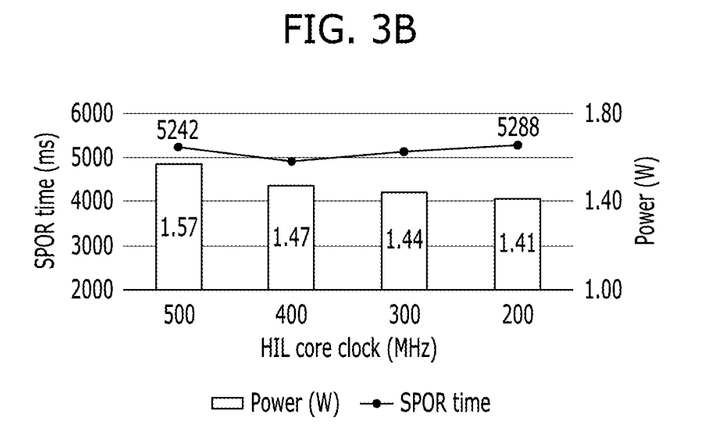
Figure 3C:
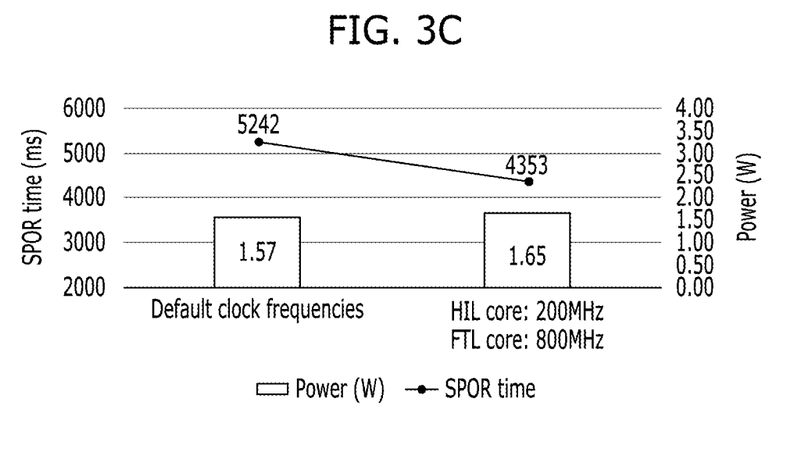

FIG. 3A to FIG. 3C illustrate how the clock frequency of each core may be experimentally determined according to the type of the event, according to an exemplary embodiment. FIG. 3A to FIG. 3C are experimental examples of changing the clock frequencies of the HIL core 132 (FIG. 3A) and the FTL core 134 (FIG. 3B), and measuring the time required for a sudden power-off recovery (SPOR) operation and the power consumption of the electronic device 130 (FIG. 3C).

The SPOR is one type of an event and when performing the SPOR operation, the FTL core 134 may have a relatively heavy workload and the HIL core 132 may have a relatively light workload.

FIG. 3A illustrates an example of the time required for the SPOR operation to complete and the power consumption of the electronic device 130, according to the clock frequency of the FTL core 134. The clock frequencies of the other cores of the electronic device 130 may be substantially maintained at the default clock frequencies.

In FIG. 3A, the default clock frequency of the FTL core 134 may be, for example, 400 MHz. The default power consumption of the electronic device 130 may be, for example, 1.57 W. The default power consumption refers to power consumed per unit time when all the cores included in the electronic device 130 operate at respective default clock frequencies. When all the cores of the electronic device 130 perform the SPOR operation while operating at the default clock frequencies, a bottleneck phenomenon may occur in the FTL core 134 due to heavy workload, and idle time may occur in the other cores including the HIL core 132 due to light workload. When all the cores of the electronic device 130 operate at the default clock frequencies, the time required for the SPOR operation may be, for example, 5,242 ms.

Increasing the clock frequency of the FTL core 134 may address the bottleneck phenomenon of the FTL core 134, so that the time required for the SPOR operation may decrease and the power consumption of the electronic device 130 may increase. For example, when the clock frequency of the FTL core 134 is 800 MHz, the time required for the SPOR operation may be shortened by about 1.1 s, that is, 22%, and the power consumption of the electronic device 130 may increase by about 0.25 W, that is, 14%.

FIG. 3B illustrates an example of the time required for the SPOR operation to complete, and the power consumption of the electronic device 130, according to the clock frequency of the HIL core 132. The clock frequencies of the other cores of the electronic device 130 may be substantially maintained at the default clock frequencies.

As the clock frequency of the HIL core 132 decreases, the power consumption of the electronic device 130 may decrease. For example, when the clock frequency of the HIL core 132 is 200 MHz, the power consumption of the electronic device 130 may decrease by about 0.16 W, that is, 10%. However, even though the clock frequency of the HIL core 132 decreases, since the workload of the HIL core 132 is light, the time required for the SPOR operation may hardly increase.

FIG. 3C is a graph depicting the time required for the SPOR operation and the power consumption of the electronic device 130 when the cores of the electronic device 130 operate at the default clock frequencies as compared to when the clock frequencies of the HIL core 132 and the FTL core 134 are changed. Referring to FIG. 3C, when all the cores of the electronic device 130 operate at the default clock frequencies, the default power consumption of the electronic device 130 may be, for example, 1.57 W and the time required for the SPOR operation may be, for example, 5,242 ms. When the clock frequencies of the HIL core 132 and the FTL core 134 are changed to 200 MHz and 800 MHz, respectively, the power consumption of the electronic device 130 may be 1.65 W and the time required for the SPOR operation may be 4,353 ms. That is, according to this example, when the system core 138 changes the clock frequencies of the HIL core 132 and the FTL core 134, the power consumption of the electronic device 130 increases only by about 5% compared to the default power consumption, so that it is possible to shorten the time required for the SPOR operation by about 20% without a substantial increase in power consumption.

The memory 144 may store, when the SPOR operation event occurs, reference data such that the clock frequency of the HIL core 132 may be changed to 200 MHz and the clock frequency of the FTL core 134 may be changed to 800 MHz based on the experimental examples described with reference to FIG. 3A to FIG. 3C.

In accordance with an embodiment of the present disclosure, the memory 144 may store a lookup table indicating the clock frequency of each core for each event type. The event type is not limited to the SPOR. Experiments similar to those described with reference to FIG. 3A to FIG. 3C may be performed for each event type. The clock frequency of each core may be determined for each event type based on data obtained by the experiments.

When the system core 138 changes the clock frequencies of the cores by using the lookup table, a core with a relatively heavy workload operates based on a relatively high clock frequency. Thus, the bottleneck phenomenon of the core may be substantially prevented. On the other hand, since a core with a relatively light workload operates based on a relatively low clock frequency, the power consumption of the core may decrease. Accordingly, while the power consumption of the electronic device 130 is substantially maintained to be substantially equal to or similar to the default power consumption, the time required for performing each event may be shortened. Furthermore, when the system core 138 changes the clock frequencies of the cores by using the lookup table, computation for the workload of each core required for performing an event in order to determine a clock frequency and the clock frequency according to the workload may be omitted, so that it is possible to improve the performance of the electronic device 130 without a computational burden on the system core 138.

Figure 4:
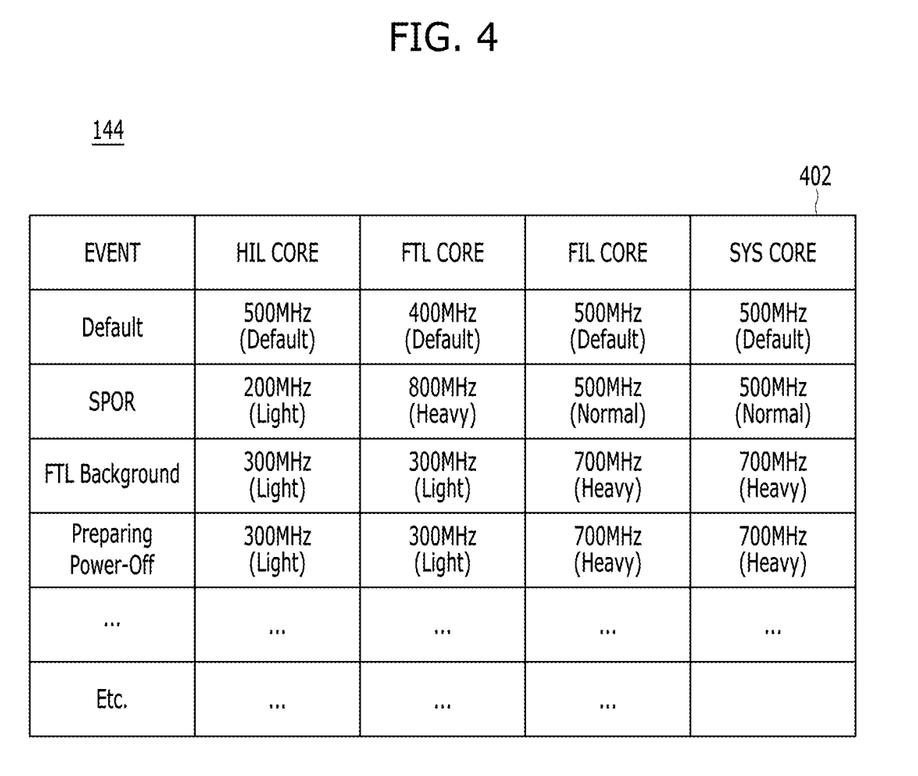
FIG. 4 is a diagram illustrating a lookup table that stores core clock frequencies for various event

FIG. 4 is a diagram illustrating a lookup table 402 stored in the memory 144.

The lookup table 402 may include information on the frequencies of clock signals to be supplied to the respective cores for each event type.

The lookup table 402 indicates default clock frequencies of the respective cores. In the example of FIG. 4, respective default clock frequencies of the HIL core 132, the FTL core 134, the FIL core 142, and the system core 138 may be determined in advance as '500 MHz', '400 MHz', '500 MHz', and '500 MHz', respectively. When each core operates based on a clock signal having the default clock frequency, the electronic device 130 may consume default power.

Depending on the workload of each core, the clock frequency of each core may also be determined in advance. 'Heavy', 'Normal', and 'Light' illustrated in FIG. 4 indicate whether the workload of each core is relatively heavy, normal, or light for each event type. Referring to FIG. 4, the clock frequency of each core may be determined in advance for each event type, and a higher clock frequency may be set for a core which is required to have a heavy workload.

However, the clock frequency of each core may be set to avoid substantial penalty in total power consumption of the electronic device 130. For example, the target may be for total power consumption to be substantially maintained, i.e., to be substantially equal to or similar to the default power consumption. Accordingly, the total power consumption of the electronic device 130 is substantially maintained within a predetermined range, but the time required for performing an individual event may be reduced.

For example, in order to perform a SPOR operation event, the FTL core 134 may be required to have a relatively heavy workload, the FIL core 142 and the system core 138 each may be required to have a normal workload, and the HIL core 132 may be required to have a relatively light workload. When the SPOR operation event occurs, the system core 138 may set the clock frequencies of the HIL core 132, the FTL core 134, the FIL core 142, and the system core 138 to exemplary values of 200 MHz', '800 MHz', '500 MHz', and '500 MHz', respectively, according to the workload required for each core. In such a case, as described with reference to FIG. 3A to FIG. 3C, the total power consumption of the electronic device 130 may be similar to the default power consumption with a difference of about 5%, but the time required for performing the SPOR operation may be reduced by 20%. FIG. 4 further illustrates the workloads and clock frequencies of the respective cores in the case of a "FTL background" operation event, a "preparing power-off" event, and the like. Even in the case of the FTL background operation event, the preparing power-off event, and the like, the clock frequencies of the respective cores may be determined in advance such that the time required when the electronic device 130 performs each event, while consuming power substantially comparable to the default power consumption, is shorter than when the respective cores operate using the default clock frequencies.

It is to be understood that the type and number of the cores, the default clock frequencies, and the workloads and clock frequencies of the respective cores for each event type, which are illustrated in the lookup table 402 of FIG. 4, are merely examples, and the present disclosure is not limited to the example of FIG. 4.

Figure 5:
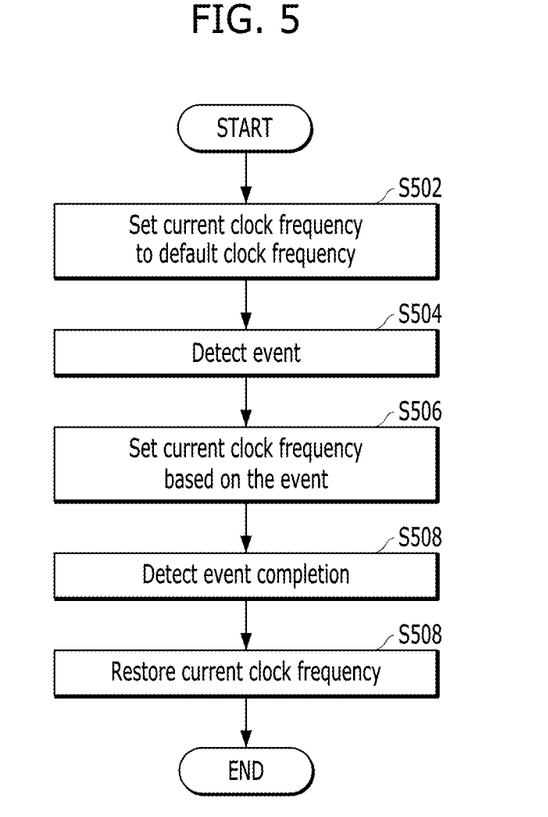
FIG. 5 is a diagram illustrating an operation of a system core in accordance with an exemplary embodiment of the present disclosure.

FIG. 5 is a diagram illustrating an operation of the system core 138 in accordance with an exemplary embodiment of the present disclosure.

In step S502, the system core 138 may set the clock frequencies of the respective cores to the default clock frequencies indicated in the lookup table as explained in connection with FIG. 4. For example, when the electronic device 130 is powered on, the system core 138 may set the clock frequencies of the respective cores to the default clock frequencies.

In step S504, the system core 138 may detect the occurrence of an event and control the HIL core 132, the FTL core 134, and the FIL core 142 to perform a job included in the event such that an operation of the detected event is performed. For example, when the need for the SPOR operation is detected after the electronic device 130 is powered on, the system core 138 may control the HIL core 132, the FTL core 134, and the FIL core 142 to perform the SPOR operation.

In step S506, the system core 138 may set the clock frequencies of the respective cores by referring to the lookup table 402 based on the type of the detected event. As described with reference to FIG. 4, the clock frequencies of the respective cores for each event type, which are included in the lookup table 402, may be experimentally determined in advance based on workloads required for the respective cores in order to perform each event.

The clock generator 140 may provide the respective cores with clock signals having frequencies set by the system core 138. Each core may perform the job included in the detected event, based on the provided clock signal. When each core operates based on the experimentally optimized clock frequency, the time required for performing the event operation by the electronic device 130 may be shortened, as compared to a case where each core operates based on the default clock frequency. However, this does not come at the cost of significantly higher total power consumption as the total power consumption of the electronic device 130 may be substantially similar to the default power consumption.

In step S508, the system core 138 may detect event completion. For example, a core that has completed the final job included in the detected event may inform the system core 138 of the event completion.

In step S510, the system core 138 may return the clock frequencies of the respective cores to the default clock frequencies in response to the detection of the event completion.

Figure 6:
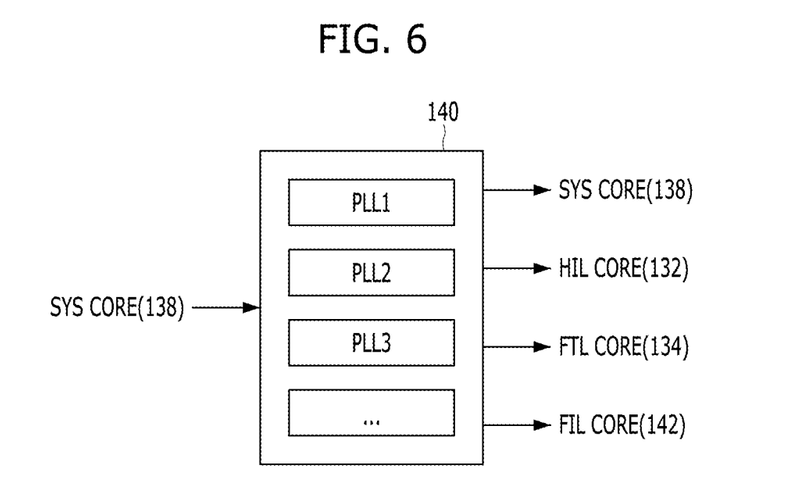
FIG. 6 is a diagram illustrating a clock generator that provides a clock signal to each core under the control of the system core.

FIG. 6 is a diagram illustrating the clock generator 140 that provides clock signals to the respective cores under the control of the system core 138 according to an exemplary embodiment.

The clock generator 140 may include a plurality of phase-locked loops (PLL). Each of the plurality of phase-locked loops PLL1, PLL2, and PLL3 may include programmable oscillators capable of generating different clock frequencies and dividers for dividing the clock frequencies.

The clock generator 140 may generate clock signals having various clock frequencies by setting division ratios of the plurality of phase-locked loops PLL1, PLL2, and PLL3.

The system core 138 may store information on the clock frequencies of the respective cores in an internal register (not illustrated). The information on the clock frequencies of the respective cores may include information on a division ratio by which the phase-locked loop PLL1, PLL2, or PLL3 divides the clock frequency.

The clock generator 140 may acquire the information on the clock frequencies of the respective cores from the internal register of the system core 138, and use the plurality of phase-locked loops PLL1, PLL2, and PLL3 to generate clock signals to be provided to the HIL core 132, the FTL core 134, the FIL core 142, and the system core 138. Then, the clock generator 140 may provide the generated clock signals to the HIL core 132, the FTL core 134, the FIL core 142, and the system core 138, respectively.

In accordance with an exemplary embodiment of the present disclosure, the system core 138 may dynamically determine the frequencies of the clock signals, which are provided to the respective cores, while substantially maintaining the power consumption of the electronic device 130 close to the default power consumption. The system core 138 may control the clock generator 140 to provide a core with a relatively heavy workload with a clock signal having a relatively high frequency according to the type of an event to be performed by the electronic device 130. When the clock signal having a relatively high frequency is provided to the core with a heavy workload, a job with a heavy workload may be processed at a higher speed. Therefore, the event can be quickly completed while the total power consumption of the electronic device 130 is not substantially increased. Consequently, the performance of the electronic device 130 with respect to power consumption can be improved.

Although a detailed exemplary embodiment has been described in the detailed description of the present disclosure, various modifications can be made without departing from the scope of the present disclosure. Accordingly, the scope of the present disclosure should not be limited to the aforementioned embodiment and should be defined by not only the claims to be described below but also those equivalent to the claims.

What is claimed is:

1. An electronic device comprising:
a plurality of cores; and
a clock generator configured to provide a plurality of clock signals to the plurality of cores, respectively,
wherein the plurality of cores includes a system core that controls the clock generator to generate the plurality of clock signals,
wherein, each of the plurality of clock signals has a frequency determined based on a type of an event of the electronic device, the clock signals being applied to the respective cores in order to perform the event, and
wherein the plurality of cores comprise:
a host interface layer (HIL) core configured to exchange data between the electronic device and a host; and
a flash translation layer (FTL) core configured to perform address mapping between the host and a memory device.

2. The electronic device of claim 1, wherein the system core is configured to detect an event and set the clock frequencies of the respective cores according to the type of the event, and
wherein, the system core is further configured to detect completion of the event and to set the clock frequencies of the respective cores to default clock frequencies.

3. The electronic device of claim 2, wherein the system core determines the clock frequencies of the respective cores such that total power consumption of the electronic device is maintained at a level substantially similar to a default power consumption level.

4. The electronic device of claim 3, wherein the default power consumption level is the total power consumption of the electronic device when the respective cores operate based on the default clock frequencies.

5. The electronic device of claim 3, wherein the clock frequencies of the respective cores are determined based on workloads required by the respective cores in order to perform the event.

6. The electronic device of claim 5, wherein the clock frequencies of the respective cores are determined to be higher frequencies as the workloads required by the respective cores are heavier.

7. The electronic device of claim 3, further comprising:
a memory configured to store a lookup table that stores information on the clock frequencies of the respective cores according to the type of the event.

8. The electronic device of claim 1, wherein the plurality of cores further comprise:
a flash interface layer (FIL) core configured to control an operation of the memory device.

9. A method of operating an electronic device that includes a plurality of cores, the method comprising:
determining clock frequencies of the respective cores based on a type of an event of the electronic device;
providing clock signals having the determined clock frequencies to the respective cores in order to perform the event;
exchanging, by a host interface layer (HIL) core of the plurality of cores, data between the electronic device and a host based on the provided clock signal; and
performing, by a flash translation layer (FTL) core of the plurality of cores, address mapping between the host and a memory device based on the provided clock signal.

10. The method of claim 9, wherein the determining of the clock frequencies of the respective cores is performed in response to detection of the event, and wherein the method further comprises:
detecting completion of the event and setting the clock frequencies of the respective cores to default clock frequencies.

11. The method of claim 10, wherein the determining of the clock frequencies of the respective cores comprises determining the clock frequencies of the respective cores such that total power consumption of the electronic device is maintained at a level substantially similar to the default power consumption level.

12. The method of claim 11, wherein the default power consumption level is the total power consumption of the electronic device when the respective cores operate based on the default clock frequencies.

13. The method of claim 11, wherein the determining of the clock frequencies of the respective cores comprises:
determining the clock frequencies of the respective cores based on workloads required by the respective cores in order to perform the event.

14. The method of claim 13, wherein the determining of the clock frequencies of the respective comprises determining the clock frequencies of the respective cores to be higher frequencies as the workloads required by the respective cores are heavier.

15. The method of claim 11, wherein the determining of the clock frequencies of the respective cores is performed by referring to a lookup table that stores information on the clock frequencies of the respective cores according to the type of the event.

16. The operation method of claim 9, further comprising:
controlling, by a flash interface layer (FIL) core of the plurality of cores, the memory device.

17. A data processing system comprising:
a host coupled to a memory system by a bus, the memory system having an electronic device coupled to a memory device, the electronic device including:
   a plurality of cores each configured to perform one or more jobs, and
   a clock generator configured to generate a plurality of clock signals provided to the plurality of cores, respectively,
wherein, the plurality of cores includes a system core that controls the clock generator to generate the plurality of clock signals,
wherein, each of the plurality of clock signals has a frequency determined based on a type of an event of the electronic device, the clock signals being applied to the respective cores in order to perform the event, and
wherein the plurality of cores comprise:
a host interface layer (HIL) core configured to exchange data between the electronic device and a host; and
a flash translation layer (FTL) core configured to perform address mapping between the host and a memory device.

18. The data processing system of claim 17 wherein the system core controls the clock generator to vary the frequency of a clock signal for a core based on the workload of the respective core.

* * * * *